(No Model.)
W. D. GOLD.
BICYCLE CONTROLLER.
No. 582,279. Patented May 11, 1897.
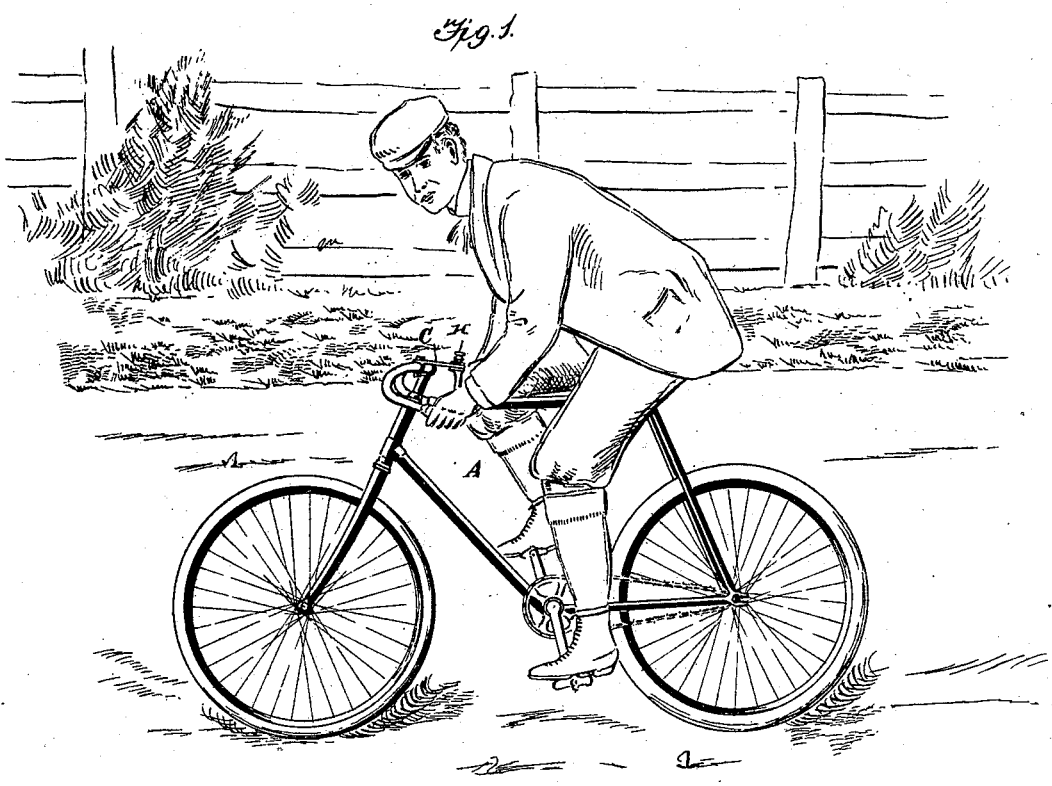
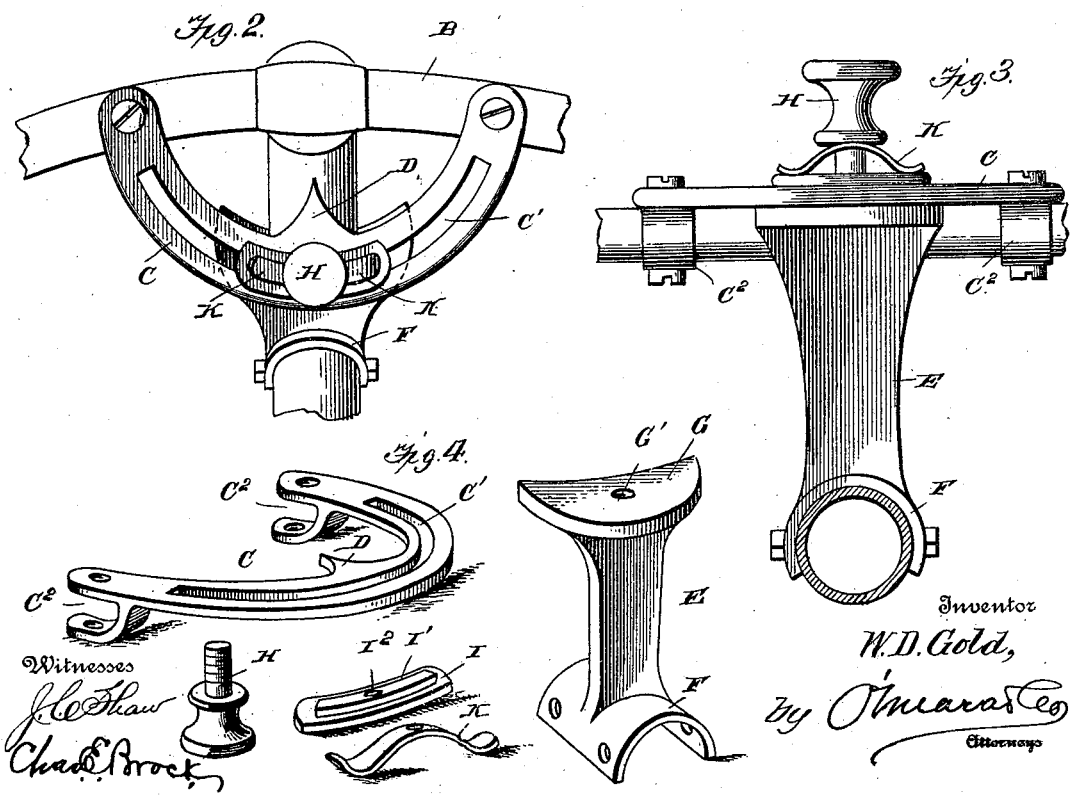

UNITED STATES PATENT OFFICE.

WILLIS D. GOLD, OF PHILADELPHIA, PENNSYLVANIA.

BICYCLE-CONTROLLER.

SPECIFICATION forming part of Letters Patent No. 582,279, dated May 11, 1897.

Application filed December 18, 1896. Serial No. 616,149. (No model.)

*To all whom it may concern:*

Be it known that I, WILLIS D. GOLD, residing at Philadelphia, in the county of Philadelphia and State of Pennsylvania, have invented a new and useful Bicycle Attachment, of which the following is a specification.

This invention relates generally to bicycles, and more particularly to an attachment adapted to be connected with the handle-bars, the object being to obtain a better control over the steering-wheel of the bicycle.

Handle-bars as now constructed are too long, thereby providing too great a leverage, and this fact has been demonstrated by expert riders grasping the handle-bars close to the steering-head.

The object of my invention, therefore, is to provide an attachment to the handle-bars whereby the steering is rendered less sensitive and by means of which the steering head and wheel are steadied.

Another object of the attachment is to provide an indicator which will show exactly when the front wheel is true or in direct line with the rear wheel.

With these objects in view my invention consists, essentially, of a slotted arc-shaped plate essentially semicircular in shape and attached to the handle-bar of the bicycle, said arc projecting rearwardly and resting upon a support attached to the upper tube of the frame, and a set-screw passing through the slot of the arc-shaped piece and into the support.

The invention consists also in employing a plate provided with a guide-rib through which the set-screw passes and also in the employment of a leaf-spring between the head of screw and the said plate.

The invention consists also in providing a pointer or indicator in connection with the semicircular-shaped arc.

The invention consists also in certain details of construction and novelties of combination, all of which will be fully described hereinafter and pointed out in the claims.

In the drawings forming a part of this specification, Figure 1 is a view showing the practical application of my invention. Fig. 2 is a top plan view of the attachment. Fig. 3 is a rear view of the support, showing the attachment connected therewith and also to the handle-bars, the upper tube of the frame being shown in section. Fig. 4 shows the various parts of the attachment detached or disconnected from the bicycle and from each other.

In the practical application of my invention it will of course be understood that the bicycle A and handle-bars B may be of any construction, and attached to the handle-bar B is a semicircular-shaped arc-shaped plate C, having the curved slot C' the greater portion of its length, and the ends of the said arc-shaped plate are provided with suitable clip-fingers $C^2$, by means of which the arc-shaped piece can be readily attached to the handle-bars, but it will of course be understood that the said plate can be attached in any other suitable manner. It will of course be understood that the arc is attached centrally of the handle-bar, and projecting forwardly from the center of the arc is an indicator or pointer D, which points directly to the center of the steering-head when the handle-bar is perfectly true.

The arc-shaped piece C is adapted to rest upon a support attached to the upper tube of the bicycle-frame, said support comprising a vertical post E, having a curved end piece F, adapted to partially embrace the tube of the frame, and upon the upper end of the post E is arranged a plate G, substantially semicircular in shape. This plate has a threaded opening G', into which the set-screw H is adapted to be screwed, said set-screw passing through a plate I, having an inner rib I', said inner rib being adapted to fit in the slot C' of the arc-shaped plate, and it will of course be understood that the plate having a rod is also provided with an opening $I^2$, through which the set-screw passes, and between the set-screw and the top of the plate I is arranged a leaf-spring K, said spring having an opening through which the set-screw passes, and by means of this spring an elastic or yielding tension between the set-screw and plate can be had.

The set-screw will be adjusted to any desired tension, according to the wish of the rider, and inasmuch as there is a constant tension exerted upon the arc through the medium of the plate it is clear that the excessive leverage of the handle-bar now in use will be reduced. Furthermore, the steadiness of the handle-bar, steering-head, and front wheel will be greatly increased, thereby relieving the rider of the severe strain exacted in keeping these parts straight. Furthermore, the pointer will indicate to a nicety whether the bicycle is traveling straight or not, and if moving upon a curve it will indicate the degree of said curvature, inasmuch as each movement of the handle-bar to one side or the other necessarily carries the pointer to one side or the other of the handle-bar or steering-head. This feature is of the greatest importance, particularly to beginners, and the steadiness of the handle-bar when mounting the bicycle is a highly important feature.

It will thus be seen that I provide an exceedingly cheap and simple construction of bicycle attachment which can be quickly and easily applied to any of the bicycles now in use and one which will fully carry out all of the objects for which it is intended.

Having thus described my invention, what I claim as new, and desire to secure by Letters Patent, is—

1. In a bicycle attachment, the combination with the slotted arc-shaped plate attached to the handle-bar of a bicycle, of the support attached to the frame of a bicycle, and the set-screw passing through the slot of the arc-shaped plate into the support, substantially as shown and described.

2. In a bicycle attachment, the combination with the slotted arc-shaped plate, of the support attached to the bicycle-frame, the plate having a rib adapted to fit into the slot in the arc-shaped plate, and a set-screw passing through the plate and arc-shaped plate and into the support, substantially as shown and described.

3. In a bicycle attachment, the combination with the slotted arc-shaped plate, of the support attached to the bicycle-frame, the set-screw and interposed plate, and the leaf-spring arranged between the plate and head of the set-screw, all arranged and adapted to operate, substantially as shown and described.

4. In a bicycle attachment, the combination with the slotted arc-shaped plate having the forward-projecting pointer or indicator, of the support attached to the bicycle-frame, the interposed plate having the curved rib adapted to seat in the slot of the arc-shaped plate, the set-screw, and the spring arranged between the head of the set-screw and the top of the plate, substantially as shown and described.

WILLIS D. GOLD.

Witnesses:
ROBT. BRIGGS,
ANNIE D. GOLD.